(12) United States Patent
Oimatsu et al.

(10) Patent No.: US 12,247,539 B2
(45) Date of Patent: Mar. 11, 2025

(54) DEVICE FOR CONTROLLING ENGINE AFTER STOPPING THE ENGINE, AND ENGINE INCORPORATED WITH THE SAME

(71) Applicant: YAMABIKO CORPORATION, Tokyo (JP)

(72) Inventors: Ayato Oimatsu, Tokyo (JP); Taiji Matsubara, Tokyo (JP); Keigo Egawa, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 18/223,060

(22) Filed: Jul. 18, 2023

(65) Prior Publication Data

US 2024/0026849 A1  Jan. 25, 2024

(30) Foreign Application Priority Data

Jul. 22, 2022 (JP) .................. 2022-117431

(51) Int. Cl.
*F02P 5/15* (2006.01)
*F02D 41/04* (2006.01)

(52) U.S. Cl.
CPC .......... *F02P 5/1504* (2013.01); *F02D 41/042* (2013.01)

(58) Field of Classification Search
CPC ................. F02P 5/1504; F02D 41/042
See application file for complete search history.

(56) References Cited

U.S. PATENT DOCUMENTS

| 4,883,033 A | 11/1989 | Hosoe et al. |
| 5,730,098 A | 3/1998 | Sasaki et al. |
| 2012/0109502 A1 | 5/2012 | Ishikawa et al. |
| 2018/0230959 A1* | 8/2018 | Hayashima ........... F02P 5/1502 |

FOREIGN PATENT DOCUMENTS

| JP | S57040662 U1 | 3/1982 | |
| JP | 2001140667 A | 5/2001 | |
| JP | 4144722 B2 * | 9/2008 | .......... F02N 11/0822 |
| JP | 2009019577 A * | 1/2009 | |
| JP | 2018009538 A * | 1/2018 | ............. Y02T 10/40 |

OTHER PUBLICATIONS

Machine Translation of JP2009019577A PDF File Name: "JP2009019577A_Machine_Translation.pdf".*
Machine Translation of JP4144722B2 PDF File Name: "JP4144722B2_Machine_Translation.pdf" (Year: 2008).*
Machine Translation of JP2018009538A PDF File Name: "JP2018009538A_Machine_Translation.pdf" (Year: 2018).*
Extended European search report issued in corresponding European Patent Application 23187069.2 dated Dec. 8, 2023 (5 pages).

* cited by examiner

*Primary Examiner* — Grant Moubry
*Assistant Examiner* — Ruben Picon-Feliciano
(74) *Attorney, Agent, or Firm* — Kilyk & Bowersox, P.L.L.C.

(57) ABSTRACT

An ignition resumption control unit (40) is disposed that resumes control of an ignition plug (14) if a first predetermined time has elapsed or if engine rotation number has fallen below a threshold value, after receiving an engine stop signal. The ignition resumption control unit (40) executes the control of the ignition plug (14), based on resumption ignition timings (Tg(R-on)) that are timing deviating from an entire ignition timing range set in a normal working area of an engine body (2).

11 Claims, 7 Drawing Sheets

DEVICE FOR CONTROLLING ENGINE AFTER STOPPING THE ENGINE, AND ENGINE INCORPORATED WITH THE SAME

BACKGROUND OF THE INVENTION

The present invention relates to a device for controlling an engine after stopping the engine, and to an engine incorporated with the device.

When an engine stop switch adapted for stopping engine action is subjected to the operator's ON operation i.e. engine-stop-instruction operation, power supply to an ignition plug is suspended to stop the engine. Japanese Utility Model Laid Open S57(1982)-40662 Publication points out a phenomenon of residual fuel burning intermittently despite acting on the engine stop switch, immediately after high-power drive. This phenomenon is called "run-on phenomenon". Burning of residual fuel causing the run-on phenomenon is referred to as "run-on combustion".

To prevent the run-on phenomenon, it has been known to suspend power supply to the ignition plug and simultaneously cut off fuel supply to the engine body in response to ON operation of the engine stop switch. Japanese Utility Model Laid Open S57(1982)-40662 Publication points out the following problem brought about by this fuel supply cutoff. That is, when fuel supply is cut off, in the process of cooling the gas fuel remaining within the engine body and the intake system, it undergoes a chemical change and turns into a gum-like substance. This gummy substance is very sticky and can cause stucking of the valve system or clogging of fuel injection nozzle.

To solve this problem, the S57(1982)-40662 Publication proposes to continue power supply to the ignition plug for a predetermined time (e.g. for 1 sec.) after ON operation of the engine stop switch. As the engine moves inertially after engine stop, residual fuel is sucked into the combustion chamber and then ignited by the ignition plug. This enables the residual fuel to be swept away from the intake system and the combustion chamber.

As described above, the S57(1982)-40662 Publication has proposed the invention that continues the ignition control even after engine stop based on the operation of the engine stop switch. According to this invention, ignition control is continued under the ignition timing set in a normal working area even after engine stop. Accordingly, after engine stop, ignition of residual fuel by the ignition plug may activate the engine. This possible phenomenon astonishes the operator since the engine continues to work in spite of acting on the drive stop switch. It takes longer for the engine to completely stop working. This is a mere loss time for the operator.

SUMMARY OF THE INVENTION

It is therefore an object of the present invention to provide an engine control device and an engine incorporated with the same, capable of shortening the duration time of the run-on phenomenon while preventing the engine from being activated by firing of the ignition plug after engine stop based on the operation of the drive stop switch.

The above technical tasks can be basically achieved by providing:
a device (40) for controlling an engine after stopping the engine, the engine having an engine body (2) that stops by interrupting ignition control of an ignition plug (14) in response to an engine stop signal, characterize in that the device (40) includes an ignition resumption control portion that resumes the control of the ignition plug (14) when a first predetermined time has elapsed or when engine rotation number has fallen below a threshold value (Th), after receiving the engine stop signal, wherein
the ignition resumption control portion executes the control of the ignition plug (14) based on resumption ignition timings that are timings deviating from an entire ignition timing range set in a normal working area of the engine body (2).

According to the present invention, the ignition plug control is resumed when the first predetermined time has elapsed or when the engine rotation number has fallen below the threshold value (Th), after receiving the engine stop signal. This resumed ignition control is executed based on the resumption ignition timings. This resumption ignition timings are timings deviating from the entire ignition timing range set in the normal working area. Consequently, after stopping the engine, the duration time of the run-on phenomenon can be reduced while preventing the engine from being activated by firing of the ignition plug (14).

Function, effects and other objects of the present invention will become apparent from the following detailed description of a preferred embodiment of the present invention.

DETAILED DESCRIPTION OF THE PRESENT INVENTION

Figure 1:
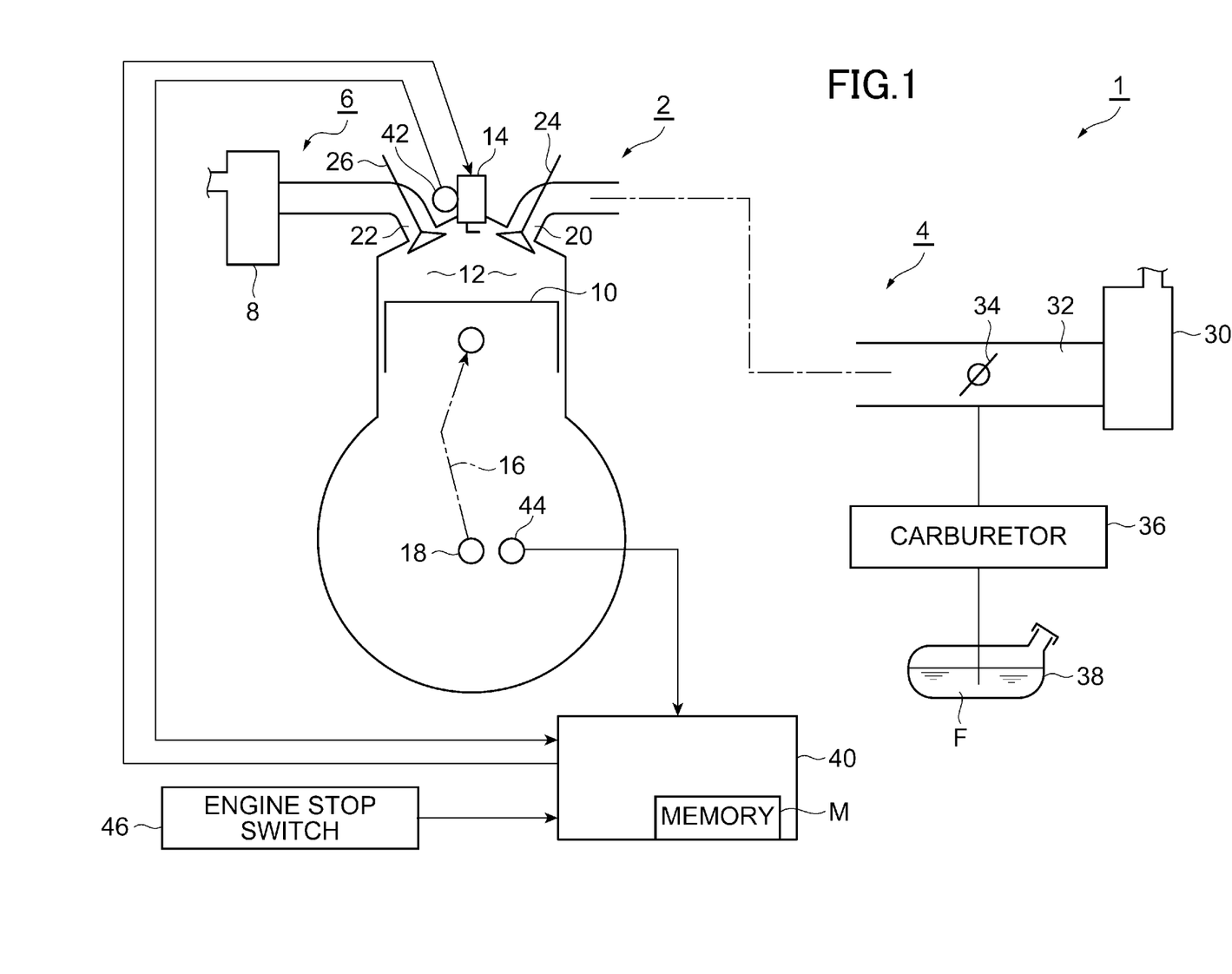
FIG. 1 is a diagram for explaining a general overview of an engine system according to an embodiment.

A preferred embodiment of the present invention will now be described with reference to the accompanying drawings. FIG. 1 is a diagram for explaining an overview of an engine system. The engine system designated at reference numeral 1 includes an engine body 2, an intake system 4 supplying air-fuel mixture to the engine body 2, and an exhaust system 6 discharging burned gas of the engine body 2 to the outside. In the diagram, reference numeral 8 denotes a muffler.

The engine body 2 has a combustion chamber 12 defined by a piston 10, with an ignition plug 14 arranged facing the combustion chamber 12. The piston 10 is coupled by a connecting rod 16 to a crankshaft 18. The crankshaft 18 outputs engine driving force.

The engine body 2 shown is an illustrative four-cycle engine. The engine body 2 has an intake port 20 and an exhaust port 22. The intake port 20 is opened or closed by an intake valve 24. The exhaust port 22 is opened or closed by an exhaust valve 26. The intake system 4 is coupled to the intake port 20. The exhaust system 6 is coupled to the exhaust port 22. The engine body 2 may be a two-cycle engine. As is well known, the two-cycle engine does not have the intake valve 24 and the exhaust valve 26. In the two-cycle engine, the intake port 20 and the exhaust port 22 are opened or closed by the piston 10. The two-cycle engine is currently used in work machines such as a brush cutter and a chain saw.

The intake system 4 has an air cleaner 30 at its upstream end and an intake passage 32 through which air filtered by the air cleaner 3 passes. A throttle valve 34 is disposed on the intake passage 32 and operated to regulate the amount of air introduced into the engine body 2 to thereby control the engine output. The intake system 4 has a carburetor 36 so that fuel F within a fuel tank 38 is supplied through the carburetor 36 to the intake passage 32 to generate air-fuel mixture. As a variant, a fuel injection valve may be employed instead of the carburetor 36. The fuel injection valve stops fuel injection the instant it receives an engine stop signal that will be described later.

The engine system 1 includes a control unit 40 that receives a temperature signal from an engine temperature sensor 42 disposed on a mounting seat of the ignition plug 14 to detect the temperature of the engine body 2 and a rotation number signal from a rotation number sensor 44 detecting the engine rotation number. The control unit 40 receives an engine stop signal from an engine stop switch 46 operated by an operator.

Figure 2:
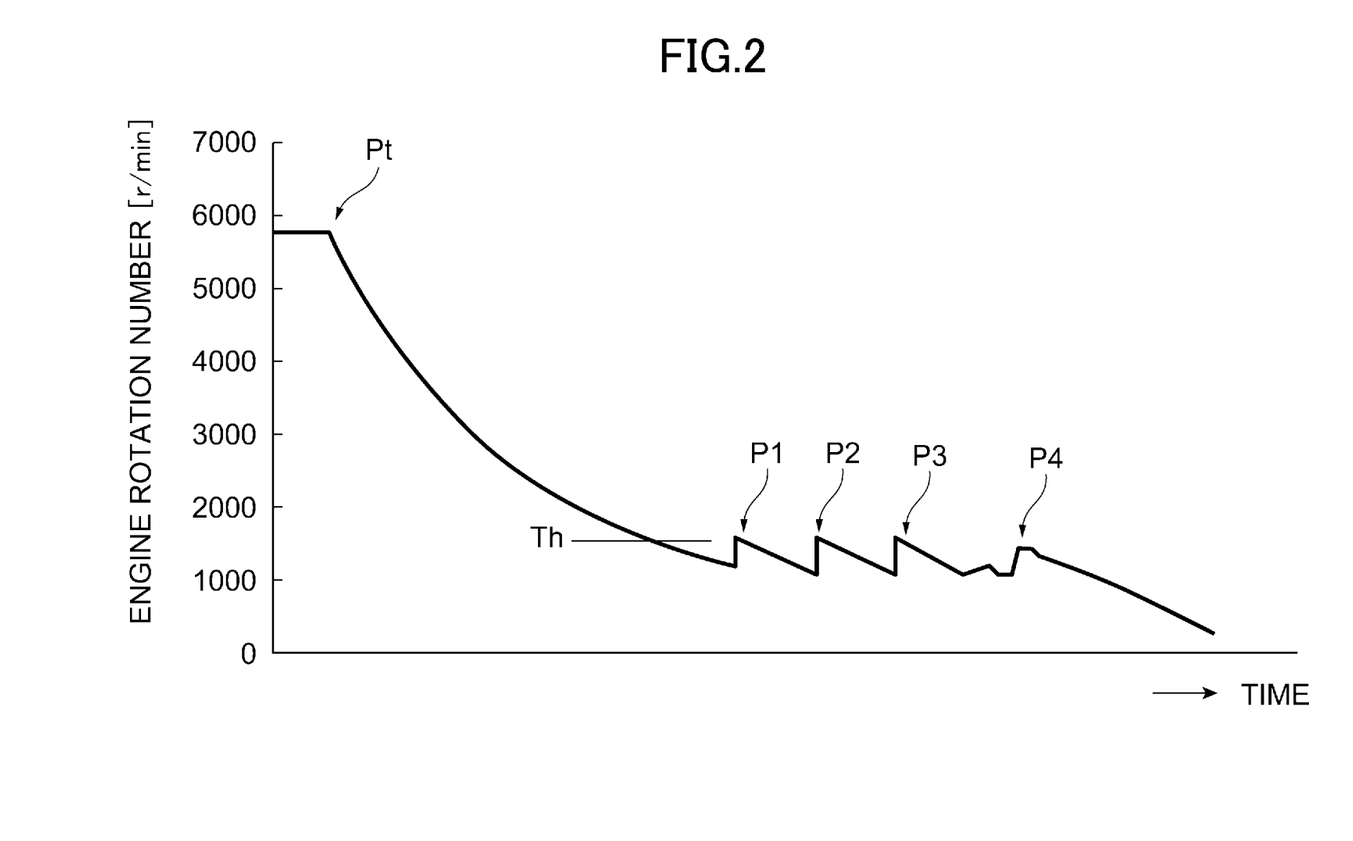
FIG. 2 is a graph for explaining a run-on phenomenon occurring upon fuel supply stop and ignition pause.

FIG. 2 is a graph for explaining a run-on phenomenon. In the diagram, reference sign Pt denotes a point of time when engine stop control is executed based on receipt of the engine stop signal. When receiving the engine stop signal, power supply to the ignition plug 14 is interrupted. As a result, the ignition plug 14 becomes practically inactive and the engine body 2 goes to stopped state while continuing its rotational motion only by inertia. In consequence, the engine rotation number decreases. As can be seen from FIG. 2, after the engine rotation number drops to approx. 1000 rpm, there appear phenomena P1 to P4 where the engine rotation number rises intermittently several times. This is a phenomenon where, despite the fact that ignition control by the control unit 40 has been stopped, air-fuel mixture remaining within the combustion chamber 12 self-ignites interdependently on the temperature gradient in the combustion chamber 12. The occurrence of this unintended combustion is the run-on phenomenon. Since the run-on phenomenon is an accidental combustion under the condition where the ignition control has already been stopped in this manner, it is difficult to control the phenomenon by quantitative and fixed control.

The carburetor 36 as a fuel supply device disclosed in FIG. 1 does not have an electronically controlled fuel supply cutoff valve. In the case of the carburetor 36 not having the fuel supply cutoff valve in this manner, when the pressure within the combustion chamber 12 goes negative, fuel is sucked out of the carburetor 36, with the result that air-fuel mixture may be introduced into the combustion chamber 12 in spite of the state where the ignition has been stopped based on the engine stop signal. As a result, the run-on phenomenon after engine stop becomes easy to occur.

In this embodiment, duration time of the run-on phenomenon is reduced by engine control executed after engine stop. This engine control includes, in addition to control to interrupt power supply to the ignition plug 14, ignition resumption control executed after a given condition is met after engine stop. In the ignition resumption control, firstly, when the control unit 40 receives the engine stop signal, the above engine stop control is executed. However, the current engine rotation number continues to be monitored by the rotation number sensor 44. Secondly, when it is detected that the descending engine rotation number has reached or fallen below a threshold value Th (FIG. 2), the ignition plug 14 is controlled based on resumption ignition timing that is timing deviating from an entire ignition timing range in an entire working area (normal working area) from idle operation to full throttle operation set in the engine body 2. This is the ignition resumption control. This ignition resumption control is referred to as "run-on suppression control". The run-on suppression control may be executed after the lapse of a first predetermined time (e.g. 2 to 4 sec. from engine stop) from a point of time when the engine stop signal was received. Thirdly, the run-on suppression control comes to an end when a second predetermined time (e.g. 5 to 6 sec. after engine stop) elapses.

The run-on suppression control detailed below is control intended for shortening the duration time of the run-on phenomenon. As described above, the resumption ignition timings, that is, run-on suppression ignition timings are set at timing deviating from the entire ignition timing range set in the normal working area in the engine body 2. If, in the engine body 2, for example, the entire ignition timing range set in the normal working area is the range of BTDC 5 to 40 degrees in crank angle, timing deviating from this range is set as the run-on suppression ignition timing. In case that e.g. the ignition timings upon idling included in the normal working area of the engine body 2 is set as the run-on suppression ignition timing, the engine may be activated by ignition of residual fuel by the ignition plug 14, and return to idle operation. Hence, in the run-on suppression control, the ignition control is executed under the run-on suppression ignition timing within the ignition timing range not overlapping with the ignition timing range set in the normal working area.

In particular, it is desirable that the ignition timing range for use in the normal working area and the ignition timing range used for the run-on suppression control do not adjoin each other as the rotation number area and be apart from each other by a predetermined timing range.

Figure 3:
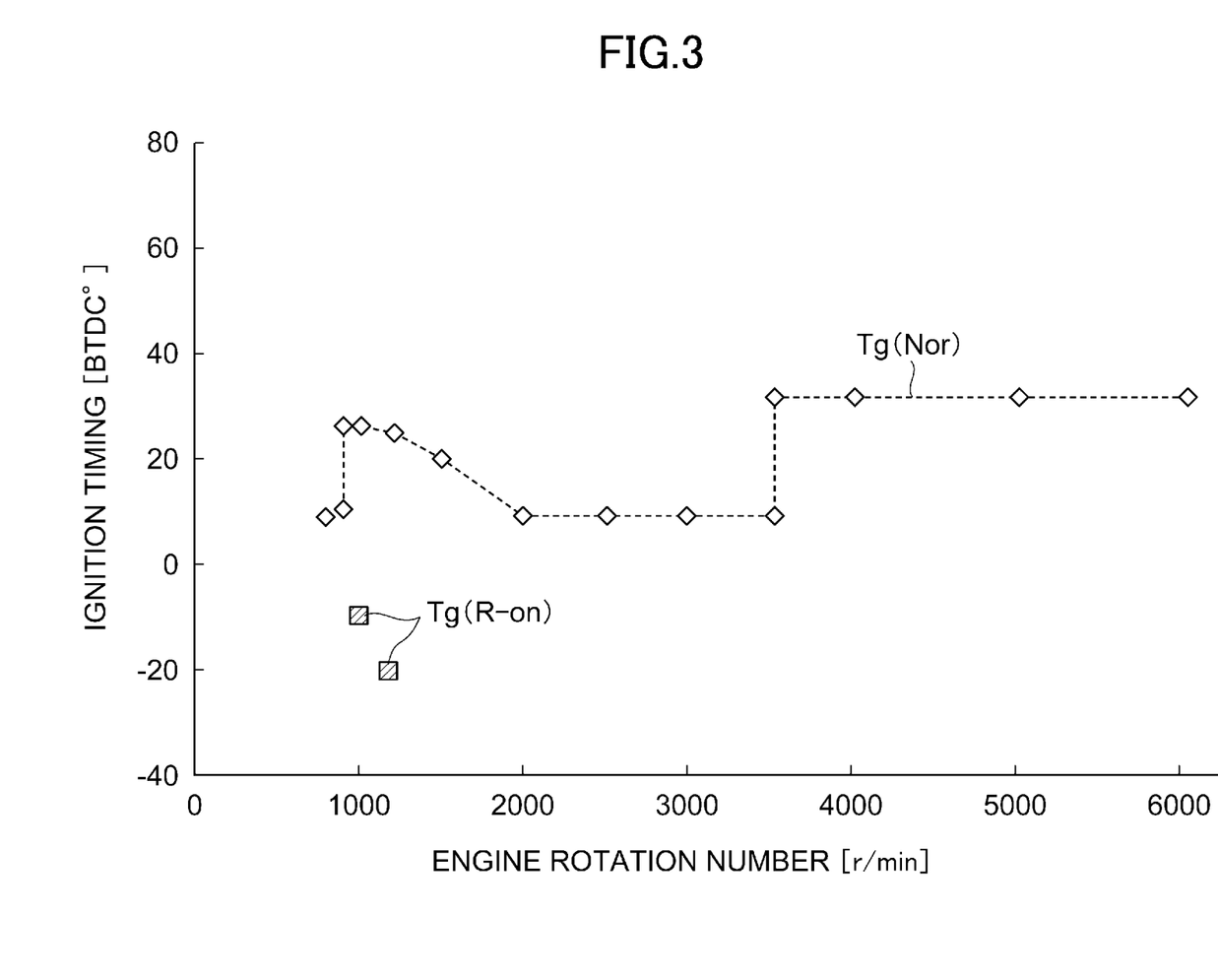
FIG. 3 is a graph for explaining an example of run-on suppression ignition timing.

Referring to FIG. 3, all ignition timings Tg(Nor) set in the normal working area of the engine body 2 are shown by a broken line. The ignition timings Tg(Nor) set in the normal working area of this engine body 2 lie within the range of BTDC 30 to 8 degrees. Reference sign Tg(R-on) of FIG. 3 denotes the run-on suppression ignition timings. The run-on suppression ignition timings Tg(R-on) are set within the range of ATDC 10 to 20 degrees. ATDC 10 to 20 degrees are the ignition timings that deviate to the retarded side from the range of the ignition timings Tg(Nor) set in the normal working area of that engine body 2, i.e., BTDC 30 to 8 degrees.

More specifically, the example of FIG. 3 relates to the setting of the run-on suppression timing, and shows the run-on suppression ignition timings are set to be retarded from the range of the ignition timings Tg (Nor) set in the normal operating region of the engine body 2. This allows the ignition plug 14 to fire immediately before the timing when the run-on combustion occurs. Then, the flying spark can induce combustion of residual fuel. That is, combustion of residual fuel can be induced after ignition of the ignition plug 14 without directly igniting the residual fuel by the ignition plug 14. As a variant, ignition timing deviating to the advanced side from the range of the ignition timing Tg(Nor) set in the normal working area of the engine body 2 may be set as the run-on suppression ignition timing.

In controlling the engine body 2, it is preferable to prepare two programs and store these programs in the memory M (FIG. 1). One program is for a normal operating control mode, wherein the engine body 2 is controlled under the ignition timings set for the entire working range from idle to full-throttle operation. The second program is for a ignition resumption control mode that is independent from the normal operating control mode and restarts ignition of the engine body 2 under the resumption ignition timings. When receiving the engine stop signal from the engine stop switch 46, the control unit 40 switches the control mode from the normal operation control mode to the ignition resumption control mode, before resuming the ignition control. Then, when the engine rotation number has reached or fallen below the threshold value Th or when the first predetermined time has elapsed, the control unit 40 may execute the engine control, based on the ignition resumption control mode. To secure improved responsiveness, it is preferred that the resumption ignition timing be set based on a map of the run-on suppression ignition timing Tg(R-on) prepared in advance.

Figure 4:
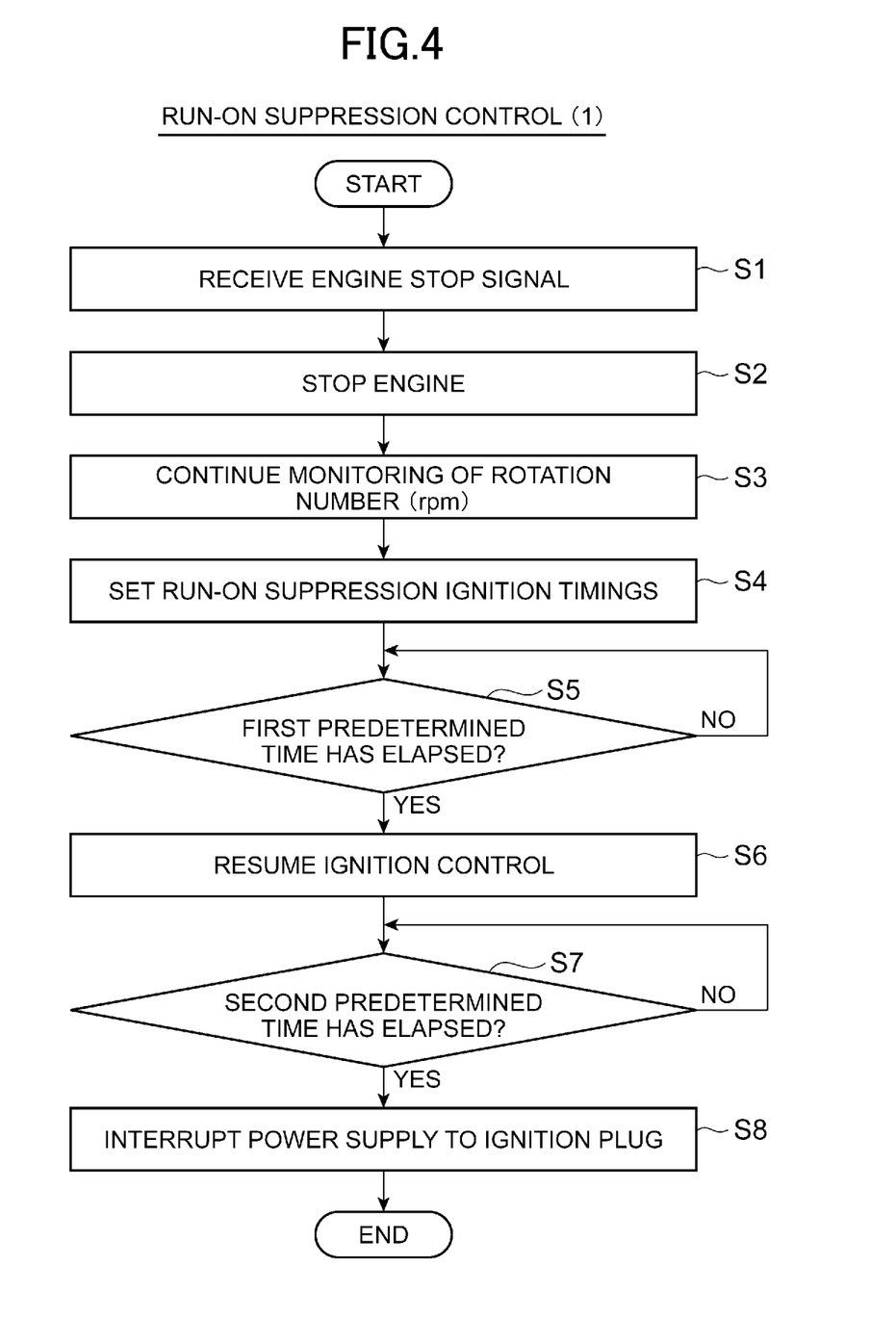
FIG. 4 is a flowchart for explaining a first example of run-on suppression control.

FIG. 4 is a flowchart related to an example of engine control succeeding receipt of the engine stop signal. Referring to FIG. 4, when the engine stop signal is received from the engine stop switch 46 at step S1, the engine stop control is executed (S2). Here, the engine stop control includes control of interrupting power supply to the ignition plug 14 to render the ignition plug 14 inactive.

At next step S3, the current rotation number monitoring by the engine rotation number sensor 44 being executed from before the engine stop is continued even after the engine is stopped, and this rotation number monitoring is executed till the end of the run-on suppression control. The run-on suppression ignition timings Tg(R-on) are then set at step S4. For example, the engine control is switched from the normal operation control mode to the ignition resumption control mode.

If at nest step S5 the first predetermined time has elapsed after receipt of the engine stop signal, the procedure goes to step S6 to resume ignition control. The ignition resumption control is executed based on the above run-on suppression ignition timings. This resumed ignition control is executed till the lapse of the second predetermined time (S7). The second predetermined time is set to, for example, 5 to 6 sec. starting from the receipt of the engine stop signal. As a variant, the second predetermined time may be set starting from the point of time of resumption of the ignition control. If the second predetermined time has elapsed, the procedure goes to step S8 to cut off power supply to the ignition plug 14. The ignition resumption control thus terminates.

Figure 5:
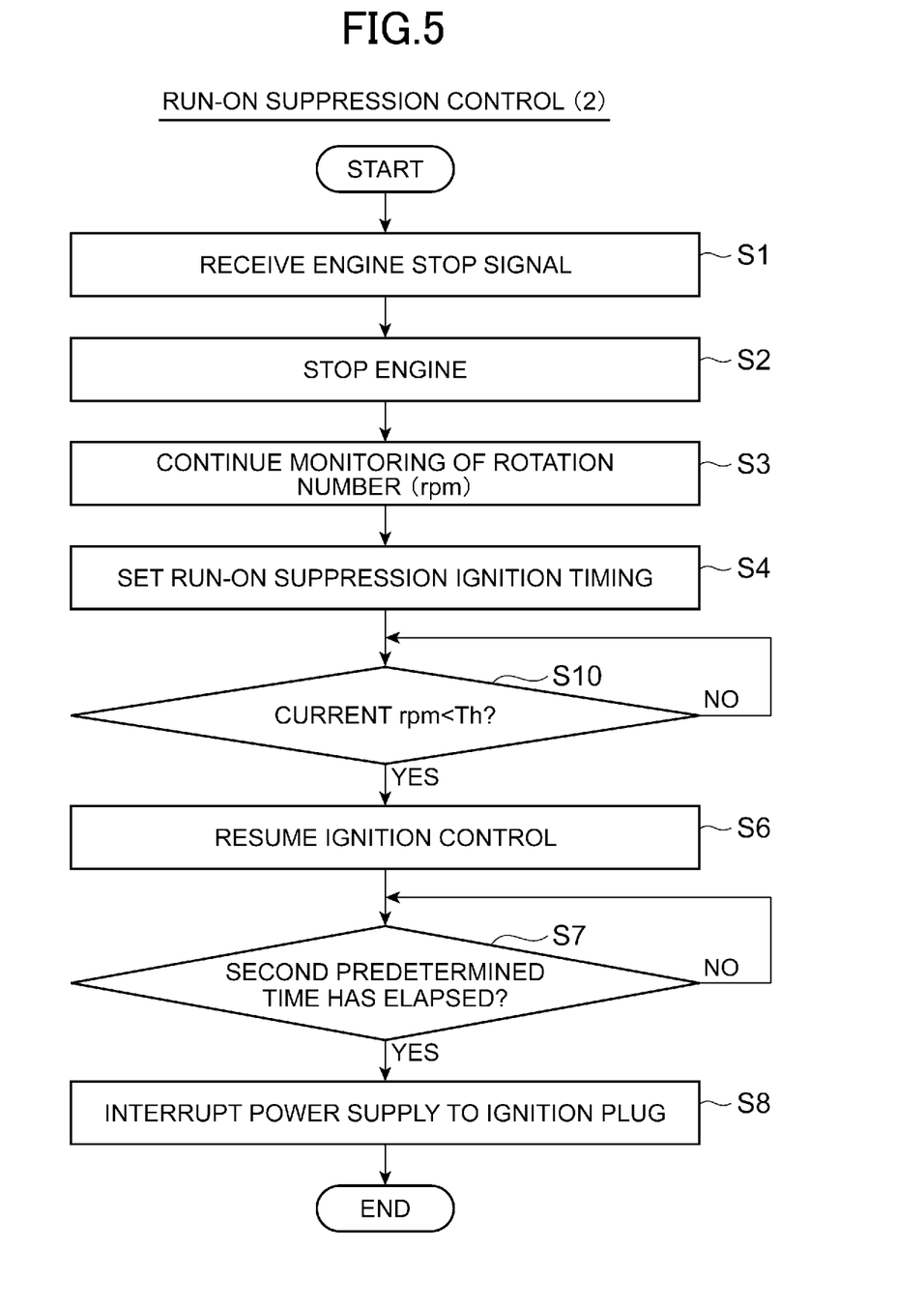
FIG. 5 is a flowchart for explaining a second example of the run-on suppression control.

FIG. 5 is a flowchart related to another example of the run-on suppression control. In the flowchart of FIG. 5, the same reference signs are imparted to the same steps as those making up the flowchart of FIG. 4, which will not again be described. In the engine control example i.e. run-on suppression control shown in FIG. 5, if at step S10 the current engine rotation number has fallen below the threshold value Th (FIG. 2), the ignition control is resumed at step S6.

Figure 6:
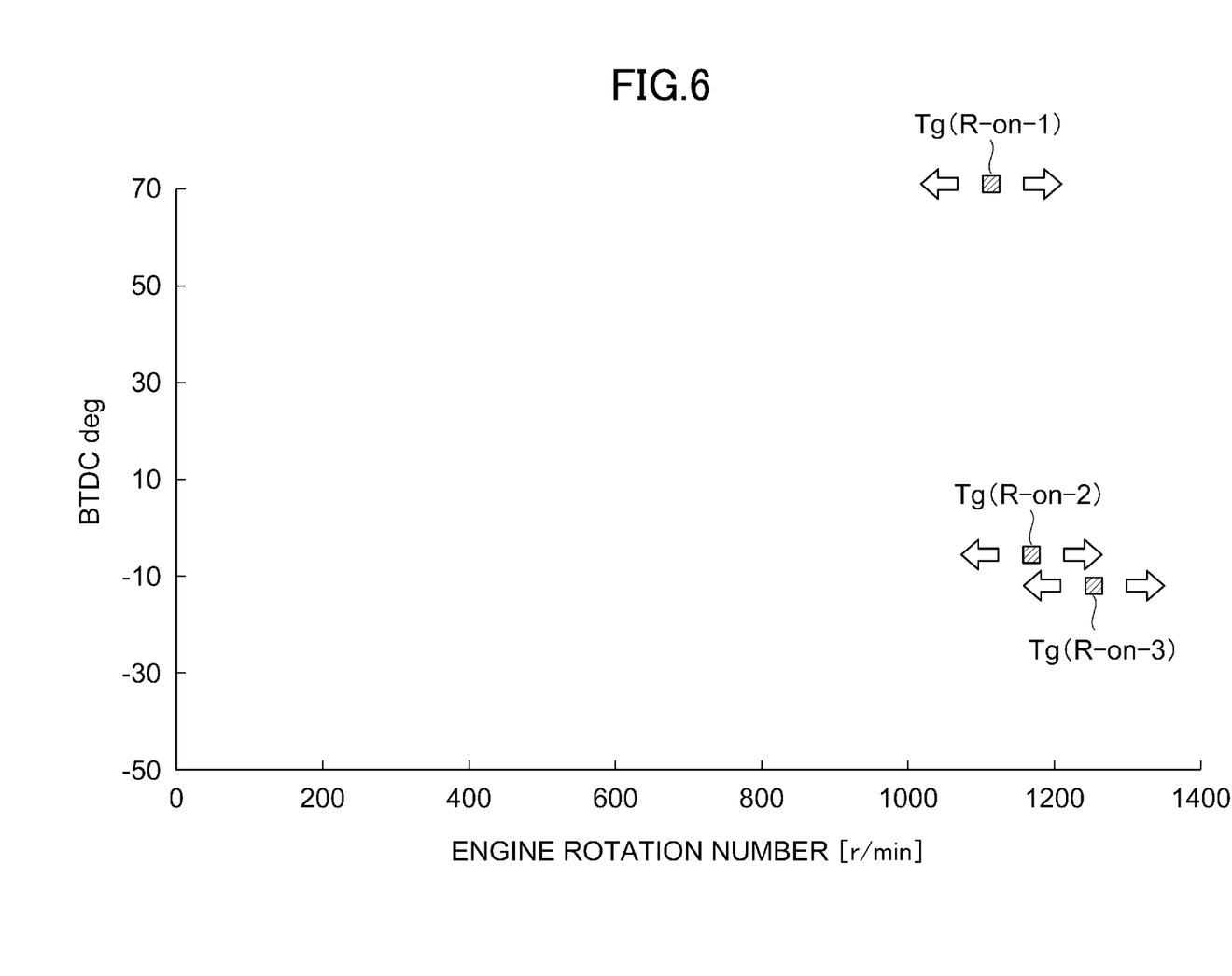
FIG. 6 is a graph for explaining another example of the run-on suppression ignition timing.

FIG. 6 shows a variant of the run-on suppression ignition timings Tg(R-on) described with reference to FIG. 3. As regards the run-on suppression ignition timing Tg(R-on) shown in FIG. 6, BTDC 70 degrees is set as first timing Tg(R-on-1) in a first area including the engine rotation number of 1100 rpm. In a second area including the engine rotation number of 1160 rpm, ATDC 8 degrees is set as second timing Tg(R-on-2). In a third area including the engine rotation number of 1250 rpm, ATDC 12 degrees is set as third timing Tg(R-on-3).

BTDC 70 degrees as the first timing Tg(R-on-1) is ignition timing that deviates to the advanced side from the range of the ignition timings Tg(Nor) set in the entire operation range i.e. the normal working area of the engine body 2, that is, the range of BTDC 30 degrees to 8 degrees. ATDC 8 degrees as the second timing Tg(R-on-2) and ATDC 12 degrees as the third timing Tg(R-on-3) are ignition timings deviating to the retarded side from the range of the ignition timings Tg(Nor) set in the normal working area of the engine body 2.

As a preferred embodiment, the set values of the run-on suppression ignition timing Tg(R-on) are changed depending on the engine temperature. Describing with the run-on suppression ignition timings Tg(R-on) of FIG. 6, the set values Tg(R-on-1), Tg(R-on-2), and Tg(R-on-3) to be standards are shifted to the high rotation number side when the engine temperature is high (e.g. the temperature of the ignition plug seat is 250 degrees centigrade or more). On the other hand, when the engine temperature is low, the set values Tg(R-on-1), Tg(R-on-2), and Tg(R-on-3) to be standards are shifted to the low rotation number side.

Figure 7:
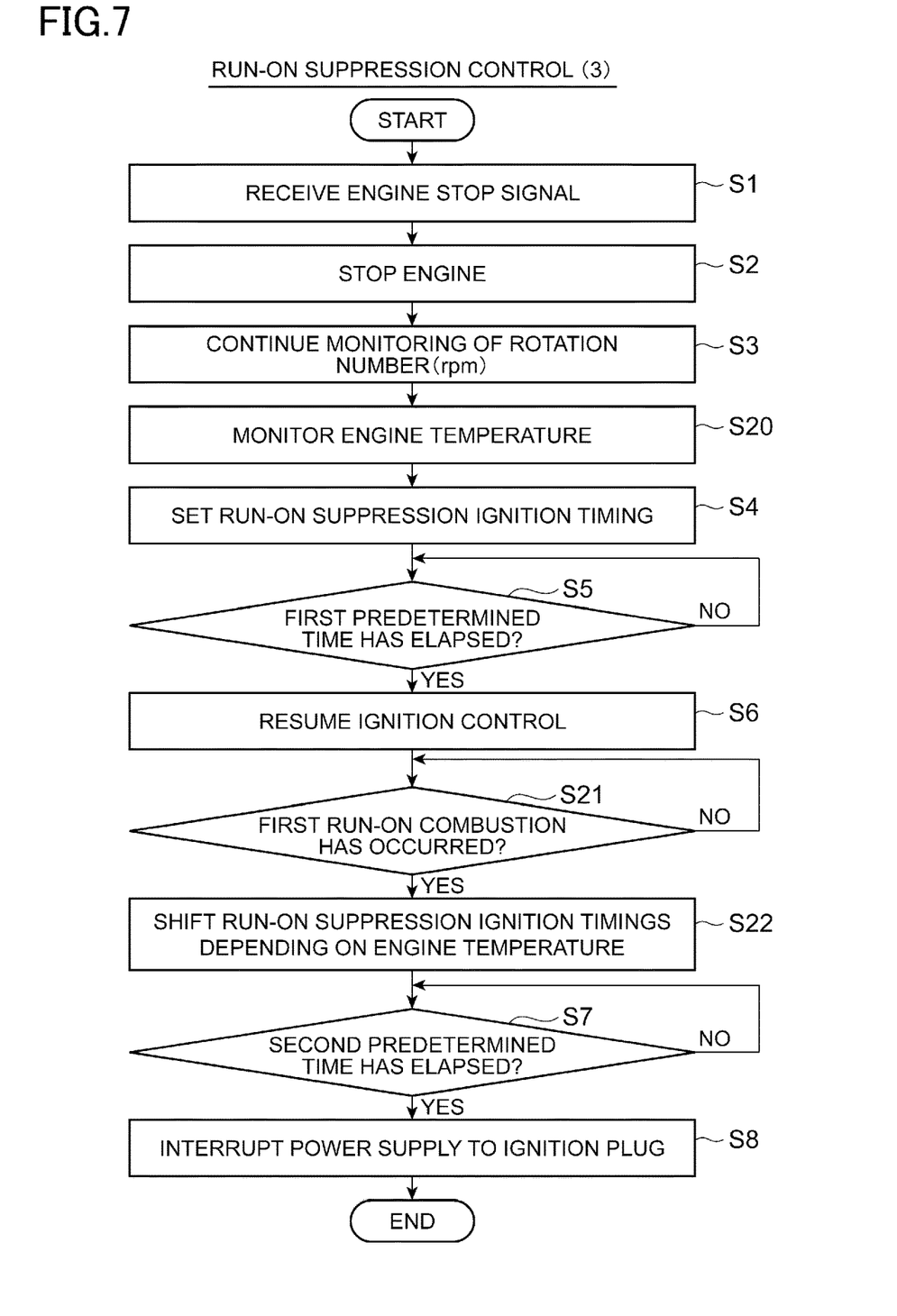
FIG. 7 is a flowchart for explaining a third example of the run-on suppression control.

FIG. 7 is a flowchart related to a further example of the run-on suppression control, the flowchart including a temperature-based setting change process of the run-on suppression ignition timings Tg(R-on). In this setting change process, at low temperature the standard set values i.e. the set values Tg(R-on-1), Tg(R-on-2), and Tg(R-on-3) shown in FIG. 6 of the run-on suppression ignition timing Tg(R-on) are shifted to the low rotation number side, whereas at high temperature they are shifted from the standard set values to the high rotation number side.

In FIG. 7, the same reference signs are imparted to the same steps as those described in the flowchart of FIG. 4, which will not again be described. When the engine stop signal is received at step S1, the engine temperature is monitored by the engine temperature sensor 42 (S20), and this temperature monitoring continues until the ignition resumption control ends at step S8. When the ignition control is resumed at step S6, the procedure goes to step S21 to determine whether first run-on combustion has occurred. This run-on combustion can be detected by detecting the acceleration of the engine rotation number. At the point of time when the first run-on combustion has occurred, ignition is correspondingly performed based on the first timing Tg(R-on-1) that is the standard set value. In relation to this first run-on combustion, ignition may be performed at timing shifted from the first timing Tg(R-on-1) as the standard set value in advance depending on the engine temperature.

At next step S22, corresponding to the second and subsequent run-on combustions, setting change is made to shift the first to third timings Tg(R-on-1), Tg(R-on-2), and Tg(R-on-3) as the standard set values depending on the engine temperature. This shift may be done gradually stepwise, or the setting change in timing may be completed by only one shift. In the case of normal engine temperature (e.g. 200 to 250 degrees centigrade in ignition plug seat temperature), the ignition control corresponding to the second and subsequent run-on combustions is executed based on the timings Tg(R-on-1), Tg(R-on-2), and Tg(R-on-3) as the standard set values. If the engine temperature is lower than that, the ignition control is executed at timings shifted from the standard set values to the low rotation number side. If the engine temperature is higher than that, the ignition control is executed at timings shifted from the standard set values to the high rotation number side.

Since residual fuel upon engine stop can be forced to burn by virtue of the above run-on suppression control, that is, the ignition resumption control, it becomes possible to sweep out residual fuel from the intake system 4, the combustion chamber 12, etc. and to shorten the duration time of the run-on phenomenon. The ignition control is resumed after a time interval following the engine stop based on the engine stop signal. In this resumed ignition control, the ignition control is executed based on the run-on suppression ignition timing i.e. the resumption ignition timing Tg(R-on) that is timing deviating from the entire ignition timing range set in the normal working area of the engine body 2. This means that ignition of the ignition plug 14 is not intended to ignite residual fuel but is intended to encourage burning of residual fuel within the combustion chamber 12 after ignition of the ignition plug 14. This can prevent the engine body 2 from being activated by the resumed ignition control to return to e.g. idle operation.

What is claimed is:

1. A device for controlling an engine after stopping the engine, the engine having an engine body that stops by interrupting ignition control of an ignition plug in response to an engine stop signal, comprising:
    an ignition resumption control unit that resumes the control of the ignition plug when a first predetermined time has elapsed or when engine rotation number has fallen below a threshold value, after receiving the engine stop signal and power supply to the ignition plug is interrupted,
    the ignition resumption control unit executing the control of the ignition plug, based on resumption ignition timing that is timing deviating from an entire ignition timing range set in a normal working area of the engine body.

2. The device for controlling an engine after stopping the engine of claim 1, wherein
    the resumption ignition timing is timing that deviates to advanced side from the ignition timing range set in the normal working area.

3. The device for controlling an engine after stopping the engine of claim 1, wherein
    the resumption ignition timing is timing that deviates to retarded side from the ignition timing range set in the normal working area.

4. The device for controlling an engine after stopping the engine of claim 1, wherein
    the resumption ignition timing includes: timing that deviates to advanced side from the ignition timing range set in the normal working area; and timing that deviates to retarded side therefrom.

5. The device for controlling an engine after stopping the engine of claim 1, wherein
    the ignition resumption control resuming the control of the ignition plug is terminated by cutting off power supply to the ignition plug after execution for a second predetermined time.

6. The device for controlling an engine after stopping the engine of claim 2 wherein
    the ignition resumption control resuming the control of the ignition plug is terminated by cutting off power supply to the ignition plug after execution for a second predetermined time.

7. The device for controlling an engine after stopping the engine of claim 3 wherein
    the ignition resumption control resuming the control of the ignition plug is terminated by cutting off power supply to the ignition plug after execution for a second predetermined time.

8. The device for controlling an engine after stopping the engine of claim 4, wherein
    the ignition resumption control resuming the control of the ignition plug is terminated by cutting off power supply to the ignition plug after execution for a second predetermined time.

9. An engine incorporated with a device for controlling an engine after stopping the engine, the engine having an engine body that stops by interrupting ignition control of an ignition plug in response to an engine stop signal, the device comprising:
    an ignition resumption control unit that resumes the control of the ignition plug if a first predetermined time has elapsed or if engine rotation number has fallen below a threshold value, after receiving the engine stop signal and power supply to the ignition plug is interrupted,
    the ignition resumption control unit resuming the control of the ignition plug, based on resumption ignition timing that is timing deviating from an entire ignition timing range set in a normal working area of the engine body.

10. The engine of claim 9, comprising:
    a fuel supply device that supplies fuel to the engine, wherein
    the fuel supply device is configured from a carburetor not having a valve that cuts off fuel supply in response to the engine stop signal.

11. The engine of claim 9, comprising:
    a fuel supply device that supplies fuel to the engine, wherein
    the fuel supply device includes a fuel injection valve that cuts off fuel supply in response to the engine stop signal.

* * * * *